US012456117B2

(12) United States Patent
Ueki (10) Patent No.: US 12,456,117 B2
(45) Date of Patent: Oct. 28, 2025

(54) VEHICLE CHARGING SYSTEM (71) Applicant: TOYOTA JIDOSHA KABUSHIKI KAISHA, Toyota (JP)

(72) Inventor: Takahiro Ueki, Mitaka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 121 days.

(21) Appl. No.: 18/474,489

(22) Filed: Sep. 26, 2023

(65) Prior Publication Data
US 2024/0193591 A1 Jun. 13, 2024

(30) Foreign Application Priority Data
Dec. 9, 2022 (JP) .................. 2022-197270

(51) Int. Cl.
*G06Q 20/38* (2012.01)
*G06Q 20/14* (2012.01)
*G06Q 30/06* (2023.01)
*G06Q 30/0645* (2023.01)

(52) U.S. Cl.
CPC ..... *G06Q 20/38215* (2013.01); *G06Q 20/145* (2013.01); *G06Q 30/0645* (2013.01)

(58) Field of Classification Search
None
See application file for complete search history.

(56) References Cited

U.S. PATENT DOCUMENTS

2021/0291676 A1* 9/2021 Dietz ............... G06Q 20/38215
2023/0057752 A1* 2/2023 Shin .................... H04W 12/069
2023/0402854 A1* 12/2023 Nagaoka ............. H04L 63/0823

FOREIGN PATENT DOCUMENTS

DE 102017208323 A1 * 11/2018 ........... H04L 9/3263
JP 2020-100245 A 7/2020

OTHER PUBLICATIONS

Roberts, B., et al., "An Authentication Framework for Electric Vehicle-to-Electric Vehicle Charging Applications", 2017 IEEE 14th International Conference on Mobile Ad Hoc and Sensor Systems (MASS) (2017, pp. 565-569). (Year: 2017).*

* cited by examiner

*Primary Examiner* — Clay C Lee
(74) *Attorney, Agent, or Firm* — SoraIP, Inc.

(57) ABSTRACT

The management server includes a memory and a processor. In addition to the certificate data, the memory stores vehicle identification information for identifying the vehicle and ECU identification information for identifying an ECU mounted on the vehicle when the certificate data is issued. The processor communicates with a specific vehicle on which ECU is mounted to obtain specific vehicle identification information for identifying the specific vehicle and ECU identification information, and executes an acquisition process of transmitting, to the specific vehicle, a first command for deleting the certificate data stored in ECU in a first instance in which the combination of the specific vehicle identification information and ECU identification information acquired from the specific vehicle is not stored in the memory.

1 Claim, 5 Drawing Sheets

VEHICLE CHARGING SYSTEM

CROSS-REFERENCE TO RELATED APPLICATION

This application claims priority to Japanese Patent Application No. 2022-197270 filed on Dec. 9, 2022, incorporated herein by reference in its entirety.

BACKGROUND

1. Technical Field

The technology disclosed in this specification relates to a management server.

2. Description of Related Art

There has been known a technique of authenticating a user of a vehicle by using certificate data stored in an ECU of the vehicle and providing a service (for example, see Japanese Unexamined Patent Application Publication No. 2020-100245 (JP 2020-100245 A)).

SUMMARY

An ECU mounted on a first vehicle may be removed from the first vehicle, and then the ECU may be mounted on a second vehicle. Here, the ECU can be mounted on the second vehicle without deleting the certificate data stored in the ECU. When the authentication using the certificate data stored in the ECU mounted on the second vehicle is executed, the authentication is performed not as the user of the second vehicle but as the user of the first vehicle.

In the present specification, a technique capable of suppressing a user of a vehicle from being authenticated as a user different from the user is provided.

According to a first aspect of the present technique, there is disclosed a management server that manages certificate data stored in an ECU of a vehicle. The management server includes: a memory storing a database describing the certificate data issued for the vehicle; and at least one processor connected to the memory. In addition to the certificate data, the memory stores vehicle identification information for identifying the vehicle, and ECU identification information for identifying the ECU mounted on the vehicle when issuing the certificate data. The processor executes an acquisition process of communicating with a specific vehicle on which the ECU is mounted to acquire specific vehicle identification information for identifying the specific vehicle and the ECU identification information, and in a first case where a combination of the specific vehicle identification information and the ECU identification information acquired from the specific vehicle is not stored in the memory, a first transmission process of transmitting, to the specific vehicle, a first command for deleting the certificate data stored in the ECU.

According to the above configuration, the management server transmits a first command for causing the specific vehicle to delete the certificate data stored in ECU in the first case when the combination of the specific vehicle identification information and the ECU identification information acquired from the specific vehicle is not stored in the memory. When receiving the first command from the management server, the specific vehicle deletes the certificate data in the ECU. As a result, the authentication using the certificate data stored in the ECU is not executed. Therefore, it is possible to suppress a user of a specific vehicle from being authenticated as a user different from the user.

In a second aspect of the present technique, in the first aspect described above, the processor may further execute, in the first case, a second transmission process of transmitting a second command requesting deletion and re-issuance of the certificate data to a service server of a service provider that provides a service to the vehicle using the certificate data.

According to the above configuration, the certificate data is re-issued without the user executing an operation for requesting the re-issuance of the certificate data. Therefore, the convenience of the user can be improved.

In a third aspect of the present technique, in the second aspect described above, the processor may further execute an update process of updating the database using the certificate data after the re-issuance, when the certificate data after the re-issuance is received from the service server after the second command is transmitted to the service server.

According to the above configuration, it is possible to appropriately manage the certificate data after re-issuance.

In a fourth aspect of the present technique, in the second or third aspect described above, the processor may further execute a third transmission process of transmitting the certificate data after the re-issuance to the specific vehicle when receiving the certificate data after the re-issuance from the service server after transmitting the second command to the service server.

According to the above configuration, the certificate data after the re-issuance is stored in the ECU even when the user does not execute an operation for storing the certificate data after the re-issuance in the ECU. Therefore, the convenience of the user can be improved.

In a fifth aspect of the present technique, in any one of the first to fourth aspects described above, the vehicle may be an electrified vehicle for mounting a rechargeable battery. The service provider may be a business provider that provides a charging service for the battery.

For example, in a charging service, when a user of a vehicle is authenticated as a user different from the user, a charging fee is charged to the user different from the user. According to the above configuration, it is possible to suppress a user of a specific vehicle from being authenticated as a user different from the user. Therefore, it is possible to appropriately provide the charging service.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Examples

Figure 1:
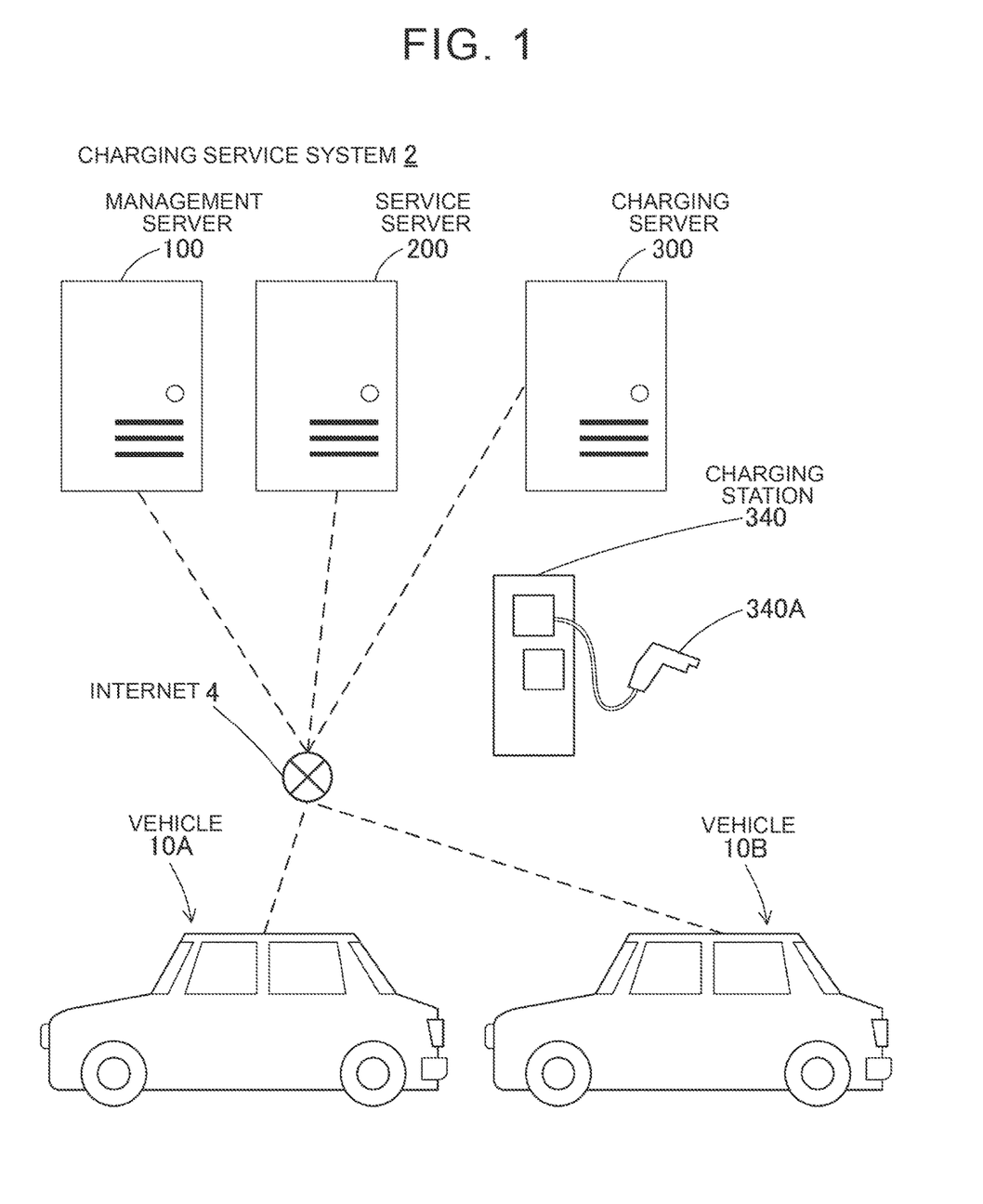
FIG. 1 shows a configuration of a charging service system 2.

Configuration of Charging Service System 2; FIG. 1

As illustrated in FIG. 1, the charging service system 2 includes a vehicle 10A, 10B, a management server 100, a service server 200, a charging server 300, and a charging station 340. The charging service system 2 is a system for providing a charging service for charging a battery 14A, 14B (see FIG. 2) mounted on a vehicle 10A, 10B.

Figure 2:
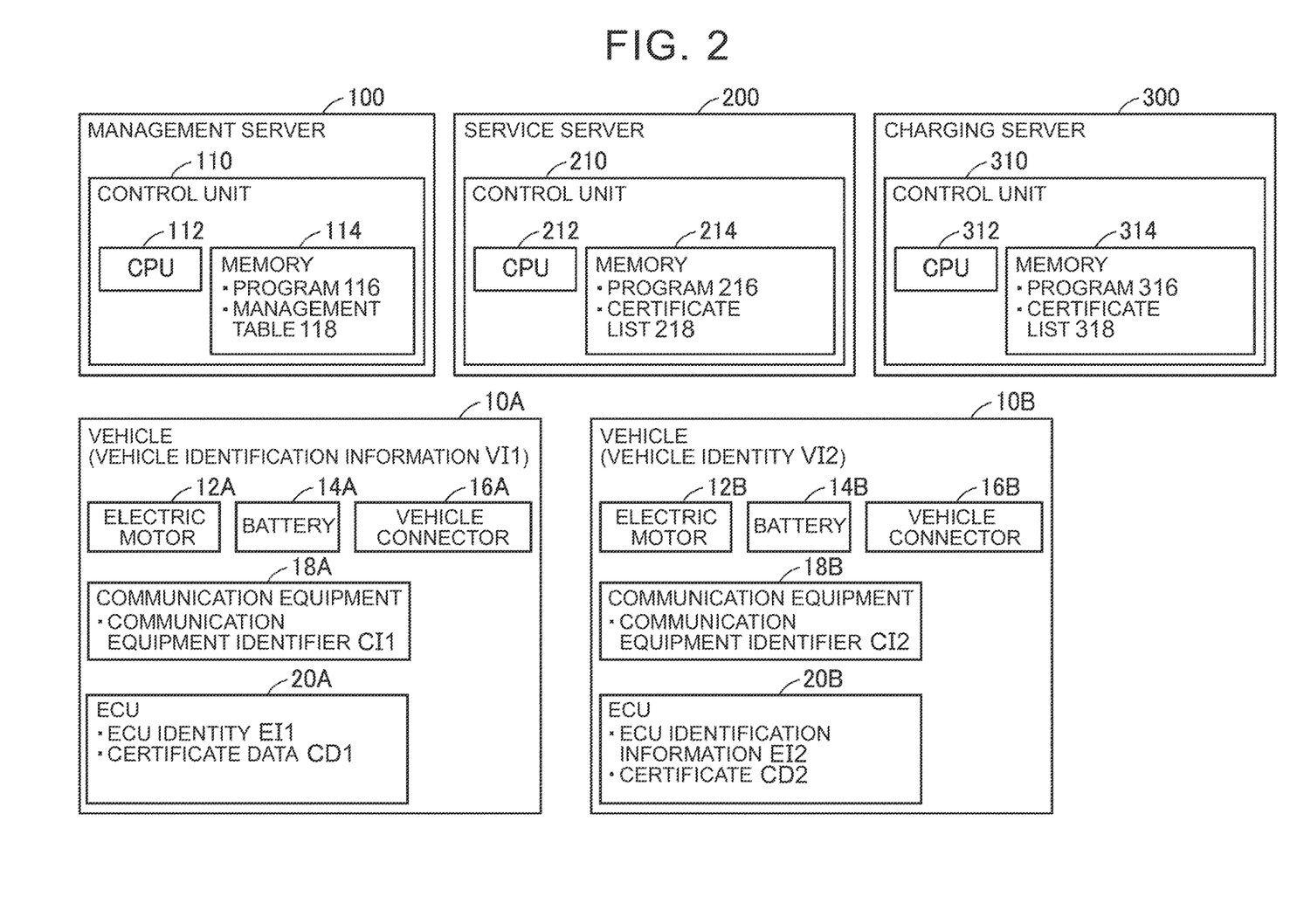
FIG. 2 shows a control configuration of each device of the charging service system 2.

Configuration of Vehicle 10A, 10B; FIG. 2

The vehicle 10A, 10B is an electrified vehicle. Electrified vehicle includes a battery-type electrified vehicle, a hybrid electrified vehicle, a plug-in hybrid electrified vehicle, and a fuel-cell electrified vehicle.

As shown in FIG. 2, the vehicle 10A includes an electric motor 12A, a rechargeable battery 14A, a vehicle-side connector 16A, a communication device 18A, and an Electronic Control Unit (ECU) 20A. The electric motor 12A is a driving motor that operates using electric power supplied from a battery 14A. The battery 14A is, for example, a lithium-ion battery. The vehicle-side connector 16A has a configuration corresponding to the cable-side connector 340A of the charging station 340. The user can connect the cable-side connector 340A to the vehicle-side connector 16A. When the vehicle-side connector 16A and the cable-side connector 340A are connected to each other, charge power is supplied to the battery 14A. When the vehicle-side connector 16A and the cable-side connector 340A are connected to each other, the vehicle 10A and the charging station 340 can perform wired communication. That is, the vehicle-side connector 16A also functions as a wired I/F. The communication device 18A is a device capable of performing radio communication. The communication device 18A is connectable to the Internet 4 (see FIG. 1). That is, the communication device 18A functions as a radio I/F. A communication device identification information CI1 for identifying a communication device 18A is stored in a memory (not shown) of the communication device 18A. ECU 20A is a device that controls the operation of the vehicle 10A. ECU 20A memories (not shown) store ECU identifying data EI1 for identifying ECU 20A and certificate data CD1 used for receiving the provision of a charge service. The certificate data CD1 is data generated by the service server 200 and issued to the vehicle 10A. The certificate data CD1 is, for example, a key certificate. In addition, a vehicle identification information VI1 for identifying the vehicle 10A is stored in a memory (not shown) of the vehicle 10A.

The vehicle 10B includes an electric motor 12B, a battery 14B, a vehicle-side connector 16B, a communication device 18B, and an ECU 20B. The electric motor 12B, the battery 14B, and the vehicle-side connector 16B have the same configuration as the electric motor 12A, the battery 14A, and the vehicle-side connector 16A, respectively. The communication device 18B has the same configuration as that of the communication device 18A except that the communication device identification information CI2 is stored. ECU 20B has the same configuration as ECU 20A except that ECU identification information EI2 and the certificate data CD2 are stored. The certificate data CD2 is data generated by the service server 200 and issued to the vehicle 10B. In addition, a vehicle identification-information VI2 for identifying the vehicle 10B is stored in a memory (not shown) of the vehicle 10B. 15

Configuration of the Management Server 100; FIG. 2

The management server 100 is provided on the Internet 4 (see FIG. 1) by, for example, an operator who sells a vehicle. The management server 100 manages information used for the charging service. The management server 100 includes a control unit 110. The control unit 110 includes a CPU 112 and memories 114. CPU 112 executes various processes according to the program 116 stored in the memory 114. The memory 114 includes a volatile memory, a non-volatile memory, and the like.

Figure 3:
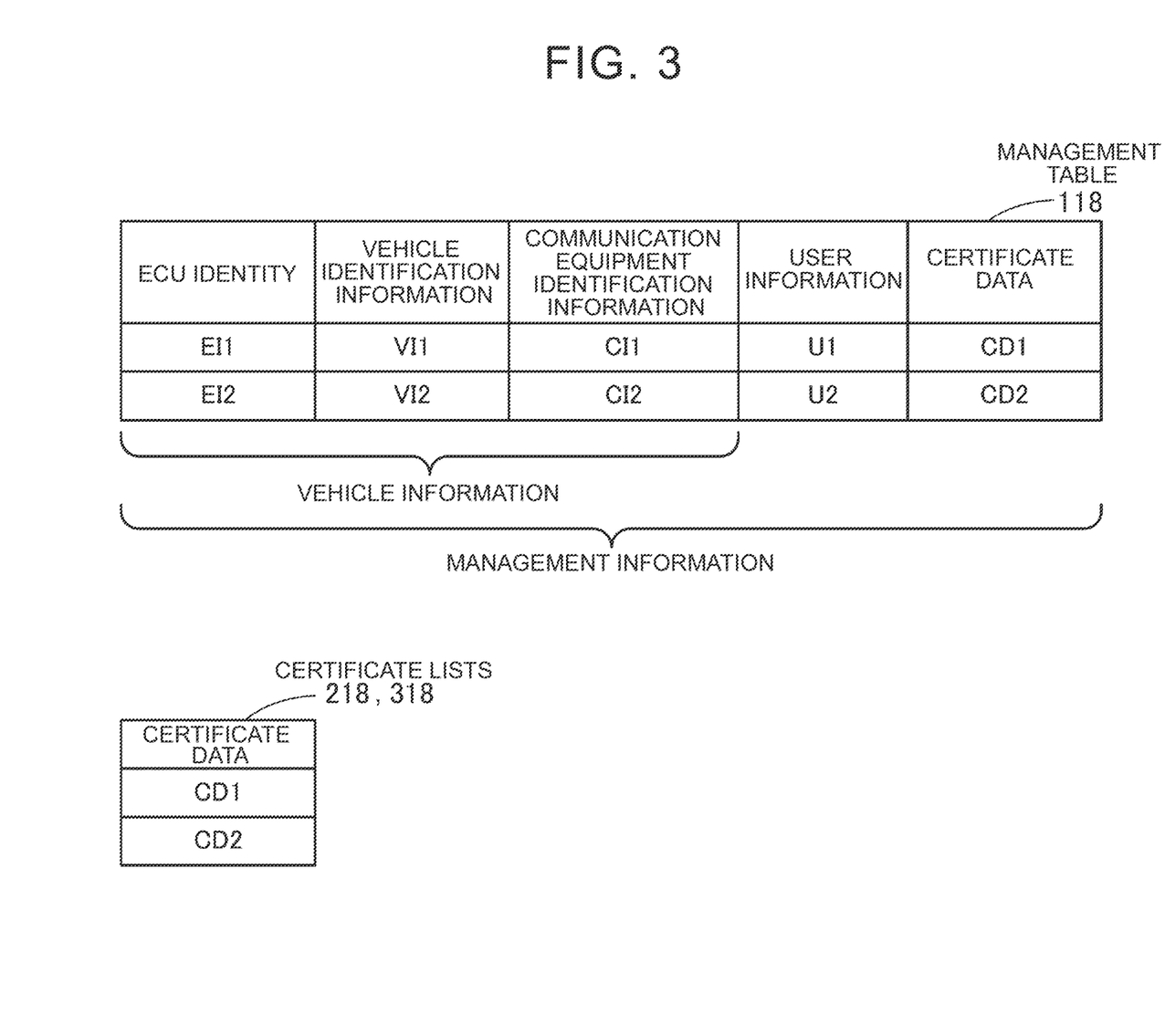
FIG. 3 shows the contents of the management table 118 and the certificate lists 218, 318.

The memory 114 further stores a management table 118. As illustrated in FIG. 3, in the management table 118, ECU identification information, the vehicle identification information, the communication device identification information, the user information, and the certificate data are stored in association with each other. The user information includes user identification information for identifying a user who is provided with a charging service, information of a credit card, and the like. Hereinafter, ECU identification information, the vehicle identification information, and the communication device identification information are collectively referred to as "vehicle information". In the following description, ECU identification information, the vehicle identification information, the communication device identification information, the user information, and the certificate data are collectively referred to as "management information".

Configuration of the Service Server 200; FIG. 2

The service server 200 of FIG. 2 is provided on the Internet 4 (see FIG. 1) by a service provider that provides a service to a vehicle using certificate data, for example. The service server 200 includes a control unit 210. The control unit 210 includes a CPU 212 and memories 214. CPU 212 executes various processes according to the program 216 stored in the memory 214. For example, the control unit 210 issues certificate data. That is, the service server 200 also functions as a certificate authority. The memory 214 includes a volatile memory, a non-volatile memory, and the like. The memory 214 further stores a certificate list 218. As shown in FIG. 3, the certificate list 218 includes one or more certificate data. In the modified example, the vehicle identification information, the user information, and the certificate data may be stored in the certificate list 218 in association with each other.

Configuration of Charging Server 300; FIG. 2

The charging server 300 of FIG. 2 is provided on the Internet 4 (see FIG. 1), for example, by an operator operating the charging station 340. The charging server 300 includes a control unit 310. The control unit 310 includes a CPU 312 and memories 314. CPU 312 executes various processes according to the program 316 stored in the memory 314. The memory 314 further stores a certificate list 318. The certificate list 318 is similar to the certificate list 218 of the service server 200.

Figure 4:
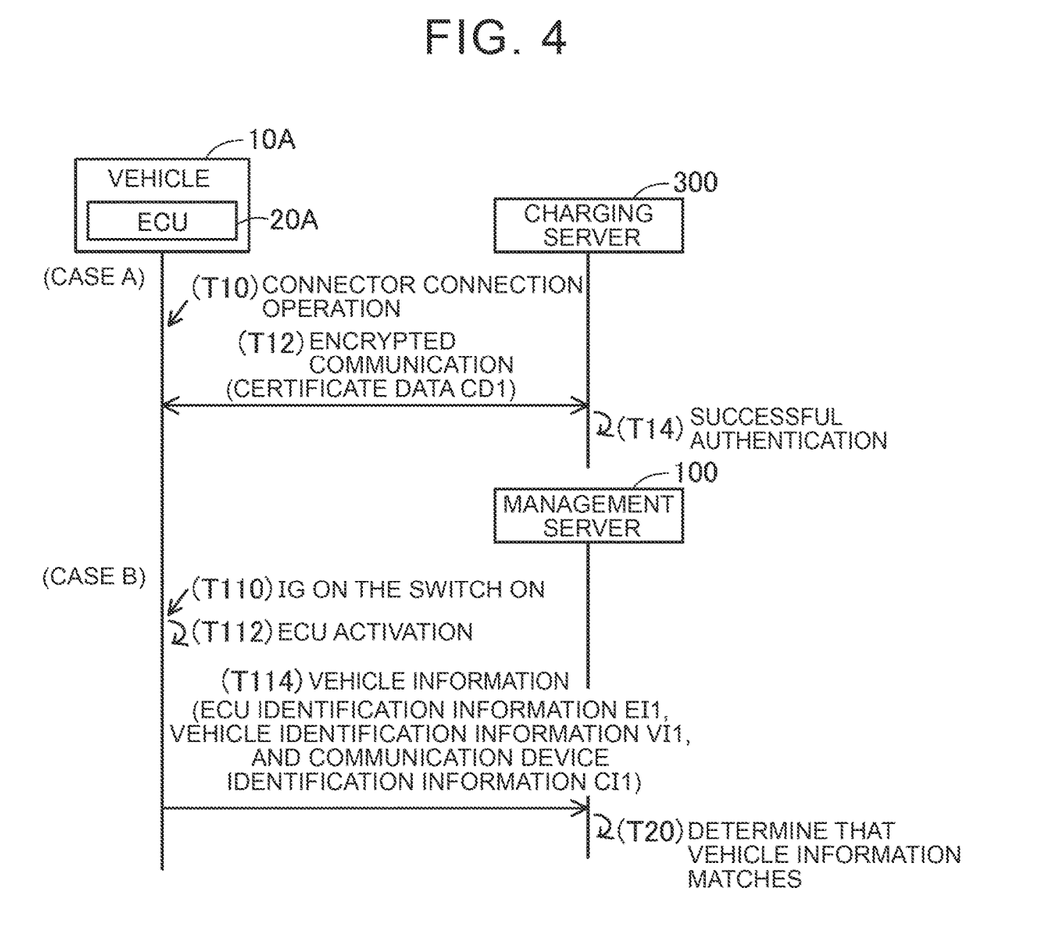
FIG. 4 shows a sequence diagram of a case A in which charging is performed and a case B in which vehicle information is transmitted from the vehicle 10A to the management server 100.
Figure 5:
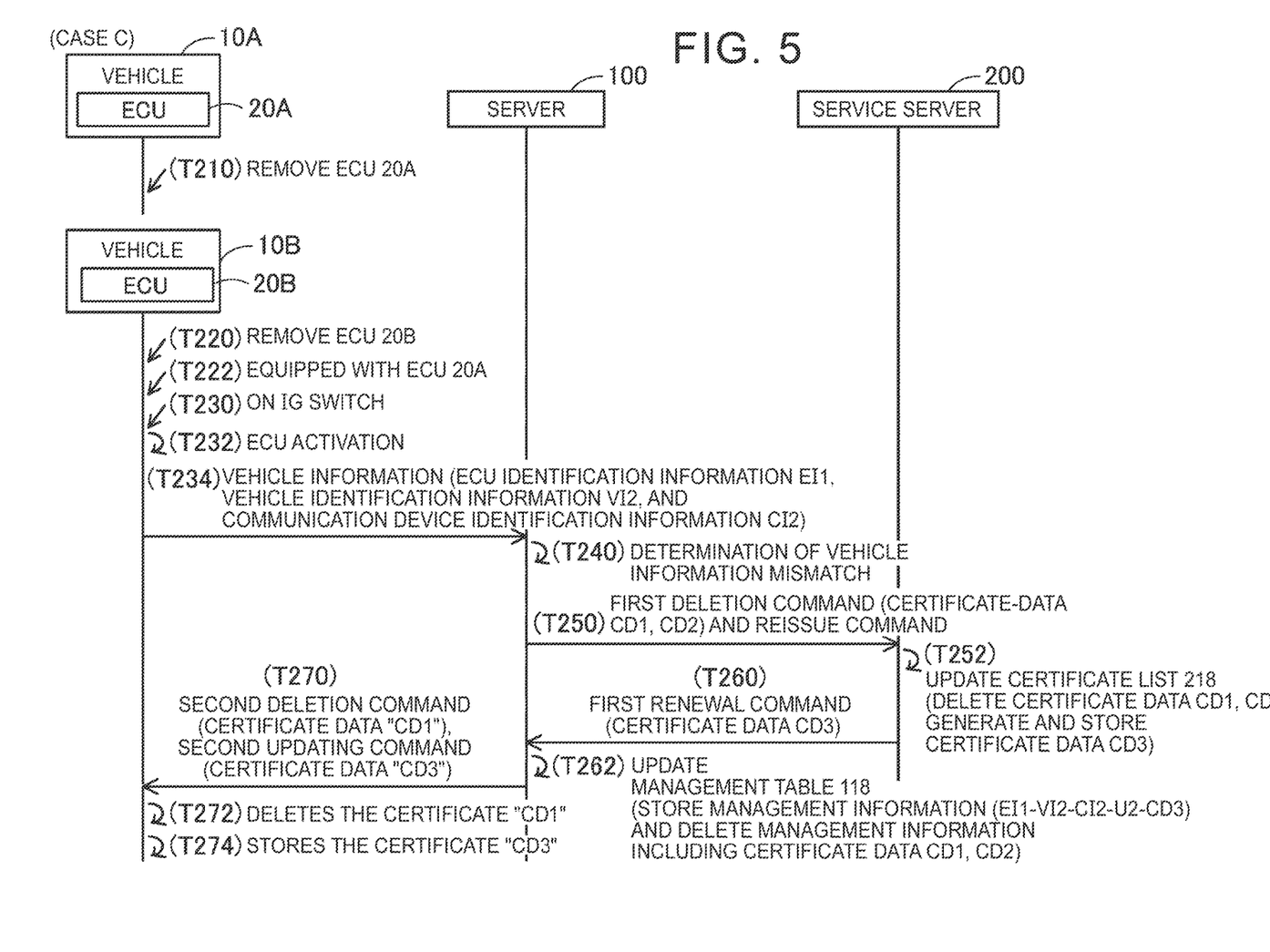
FIG. 5 is a diagram of a case B in which vehicle data is transmitted from vehicle 10B to the management server 100.

Specific Cases; FIGS. 4 to 6

With reference to FIG. 4 to FIG. 6, a specific case A to a case C executed by the charging service system 2 of the present embodiment will be described.

Case A; FIG. 4

Referring to FIG. 4, a case A in which a battery 14A mounted on a vehicle 10A is recharged will be described. In the initial state of the case A, in the management table 118, ECU identification information EI1, the vehicle identification information VI1, the communication device identification information CI1, the user information U1, and the certificate data CD1 are stored in association with each other, and ECU identification information EI2, the vehicle identification information VI2, the communication device identification information CI2, the user information U2, and the certificate data CD2 are stored in association with each other (see FIG. 3). Certificate data CD1, CD2 is stored in the certificate lists 218 and 318. In ECU 20A of the vehicle 10A and ECU 20B of the vehicle 10B, certificate data CD1, CD2 are stored.

The user of the vehicle 10A performs a connector connecting operation in T10 for connecting the cable-side connector 340A of the charging station 340 and the vehicle-side connector 16A of the vehicle 10A. By connecting the vehicle-side connector 16A and the cable-side connector 340A, the vehicle 10A can communicate with the charging servers 300 via the charging station 340 and the Internet 4.

The vehicle 10A transmits the certificate-data CD1 to the charging servers 300 using encrypted communication (e.g., TLS communication) in T12.

Upon receiving the certificate data CD1 from the vehicle 10A in T12, the charging server 300 executes authentication using the received certificate data CD1 in T14, and the authentication succeeds. Although not shown, the charging server 300 transmits information indicating that authentication is successful to the charging station 340. The charging station 340 starts supplying charging power to the vehicle 10A. When the charging power is supplied to 10A, the charging station 340 transmits charge data indicating the charging charge to the charging servers 300. The charging server 300 transmits the certificate data CD1 and the fee information to the management server 100 via the service server 200. The management server 100 specifies the user information U1 associated with the received certificate data CD1 in the management table 118, and executes a process of settling the charge fee by using the information of the credit card indicated by the specified user information U1. As described above, only the user performs the connector-connecting operation, and the authentication, the charging of the battery 14A, and the settlement of the charging fee are automatically performed.

Case B; FIG. 4

Referring to FIG. 4, a case B in which the vehicle information transmitted from the vehicle 10A to the management server 100 matches the vehicle information stored in the management server 100 will be described. The initial state of case B is the same as the initial state of case A.

A user of the vehicle 10A turns on the ignition switch in T110. In T112, an ECU 20A or the like mounted on the vehicle 10A is activated. In T114, the vehicle 10A transmits vehicle information including ECU identification information EI1, the vehicle identification information VI1, and the communication device identification information CI1 to the management servers 100.

When receiving the vehicle information from the vehicle 10A in T114, the management server 100 determines that the combination of the received ECU identification information EI1, the vehicle identification information VI1, and the communication device identification information CI1 matches the received ECU identification information EI1, the vehicle identification information VI1, and the communication device identification information CI1 in the management table 118. That is, the management server 100 determines that the vehicle information matching the received vehicle information is stored in the management table 118. In this case, the management server 100 does not update the management table 118. The vehicle 10A is configured to periodically transmit vehicle data to the management servers 100. Therefore, even if the transmission of the vehicle information immediately after ECU 20A or the like mounted on the vehicle 10A is activated fails, the vehicle information can be reliably transmitted to the management servers 100.

Case C; FIG. 5

Referring to FIG. 5, a case C in which the vehicle information transmitted from the vehicle 10B to the management server 100 does not coincide with the vehicle information stored in the management server 100 will be described. The initial state of the case C is the same as the initial state of the case A of FIG. 4. In this case, it is assumed that ECU 20A, 20B fails.

An operator (e.g., a vehicular merchant serviceman) removes ECU 20A from the vehicle 10A at T110. The operator then repairs ECU 20A. In this case, it is assumed that the operator forgets to delete the certificate data CD1 stored in ECU 20A. Although not shown, the operator mounts an ECU that differs from ECU 20A on the vehicle 10B.

In T220, the operator removes the vehicle 10B from ECU 20B, and in T222, attaches the certificate data CD1 stored ECU 20A to the vehicle 10B. The operator turns on the ignition switch in T230. In T232, an ECU 20A or the like mounted on the vehicle 10B is activated. In T234, the vehicle 10B transmits vehicle information including ECU identification information EI1, the vehicle identification information VI2, and the communication device identification information CI2 to the management servers 100.

When receiving the vehicle information from the vehicle 10B in T234, the management server 100 determines that the vehicle information matching the received vehicle information (ECU identification information EI1, the vehicle identification information VI2, and the communication device identification information CI2) is not stored in the management table 118 in T240. In this case, the management server 100 specifies the certificate data CD1 associated with the received ECU identification information EI1 and the certificate data CD2 associated with the received vehicle identification information VI2 in the management table 118. Then, in T150, the management server 100 transmits a first deletion command including the specified certificate data CD1, CD2 and a reissue command to the service server 200. The deletion command is a signal for requesting deletion of certificate data included in the command. The reissue command is a signal for requesting creation of new certificate data.

Upon receiving the first deletion command and the reissue command from the management server 100 in T250, the service server 200 updates the certificate list 218 in T252. Specifically, the service server 200 deletes the certificate data CD1, CD2 included in the first deletion command from the certificate list 218. The service server 200 also generates a new certificate data CD3 and stores the generated certificate data CD3 in the certificate list 218. Then, in T260, the service server 200 transmits a first updating command including the certificate data CD3 to the management server 100. Although not shown, the service server 200 deletes the certificate data CD1, CD2 and transmits a command for storing the certificate data CD3 to the charging server 300. The charging server 300 deletes the certificate data CD1, CD2 from the certificate list 318 and stores the certificate data CD3 in the certificate list 318.

When the management server 100 receives the first update command from the service server 200 in T260, it updates the management table 118. Specifically, the management server 100 specifies the user information U2 associated with the received vehicle-identification information VI2 in the management table 118. Next, the management server 100 stores management information including the received ECU identification information EI1, the received vehicle identification information VI2, the received communication device identification information CI2, the identified user information U2, and the received certificate data CD3 in the management table 118. In addition, the management server 100 deletes management information including the certificate data CD1 and management information including the certificate data CD2 from the management table 118. Then, in T270, the management server 100 transmits the second deletion designation including the certificate data CD1 and the second updating command including the certificate data CD3 to the vehicle 10B.

Upon receiving the second deletion command and the second updating command from the management server 100 in T270, the vehicle 10B deletes the certificate data CD1 stored in the ECU 20A and stores the certificate data CD3 in ECU 20A. Thereafter, the vehicle 10B and the charging servers 300 perform communication using the certificate data CD3 when the user of the vehicle 10B performs a connector connecting operation for connecting the cable-side connector 340A of the charging station 340 and the vehicle-side connector 16B of the vehicle 10B. In this situation, the user of the vehicle 10B is charged the charging fee required to charge the battery 14B of the vehicle 10B.

As described above, the management server 100 includes a memory 114 that stores a management table 118 (an example of a "database") describing certificate data CD1 issued to the vehicle 10A, and a CPU 112 (an example of a "processor"). In addition to the certificate data CD1, the memory 114 stores a vehicle identification information VI1 for identifying a vehicle 10A and an ECU identification information EI1 for identifying an ECU 20A mounted on the vehicle 10A when the certificate data CD1 is issued. The management server 100 communicates with a vehicle 10B (an example of a "specific vehicle") on which ECU 20A is mounted, and acquires vehicle identification information VI2 (an example of "specific vehicle identification information") for identifying the vehicle 10B and ECU identification information EI1 (T234 of FIG. 5). The management server 100 transmits, to the vehicle 10B, a second deletion command (an exemplary "first command") for deleting the certificate data CD1 stored in ECU 20A in a first case (case C in FIG. 5) in which the combination of the vehicle identification information VI2 and ECU identification information EI1 acquired from the vehicle 10B is not stored in the memory 114 (T270 in FIG. 5).

According to the above configuration, when receiving the second deletion command from the management server 100, the vehicle 10B deletes the certificate data CD1 in ECU 20A (T272 in FIG. 5). As a result, the authentication using the certificate data CD1 stored in ECU 20A is not executed. Therefore, it is possible to suppress the user of the vehicle 10A from being authenticated as a user differing from the user.

Further, in the first case (case C in FIG. 5), the management server 100 transmits a first deletion command and a reissue command (an example of the "second command") to the service server 200 (T250 in FIG. 5).

According to the above configuration, the certificate data is re-issued without the user executing an operation for requesting the re-issuance of the certificate data. Therefore, the convenience of the user can be improved.

Further, the management server 100 further updates the management table 118 using the certificate data CD3 when receiving the certificate data CD3 (an example of "certificate data after reissuance") from the service server 200 after transmitting the first deletion command and the reissue command to the service server 200 (T260 in FIG. 5) (T262 in FIG. 5).

According to the above configuration, it is possible to appropriately manage the certificate data CD3.

The management server 100 further transmits the first deletion command and the reissue command to the service server 200, and then transmits the certificate data CD3 to the vehicle 10B when the certificate data CD3 is received from the service server 200 (T260 in FIG. 5) (T270 in FIG. 5).

According to the above configuration, the certificate data CD3 is stored in ECU 20A even if the user does not perform an operation for storing the certificate data CD3 in ECU 20A. Therefore, the convenience of the user can be improved.

The vehicle 10B is an electrified vehicle equipped with a rechargeable battery 14B. The service provider is a provider that provides a battery charging service.

In a charging service, when a user of a vehicle is authenticated as a user different from the user, a charging fee is charged to a user different from the user. According to the above configuration, it is possible to suppress the user of the vehicle 10B from being authenticated as a user that differs from the user. Therefore, it is possible to appropriately provide the charging service.

While specific examples of the technology disclosed in the present specification have been described in detail above, these examples are merely illustrative and do not limit the scope of the claims. The techniques described in the claims include various modifications and alterations of the specific examples illustrated above.

First Modification

When the combination of the vehicle identification information VI2 and ECU identification information EI1 acquired from the vehicle 10B is not stored in the memory 114, the management server 100 may not transmit the first deletion command and the reissue command to the service server 200. In this modification, T262, T274 can be omitted from T250 of the case C in FIG. 5. In the present modification, the "second transmission processing", "update processing", and "third transmission processing" can be omitted.

Second Modification

The management server 100 does not have to store the management information including the certificate data CD3 in the management table 118 in T262 of the case C in FIG. 5. In this modification, the management server 100 may store the management information including the certificate data CD3 in the management table 118 when receiving a command to update the management table 118 from the vehicle 10B.

Third Modification

The management server 100 may not transmit the second updating command in T270 of the case C in FIG. 5. In this modification, the management server 100 may transmit the second updating command to the vehicle 10B when receiving the command requesting the transmission of the certificate data CD3 from the vehicle 10B.

In addition, the technical elements described in the present specification or the drawings exhibit technical usefulness alone or in various combinations, and are not limited to the combinations described in the claims at the time of filing. The technology illustrated in the present specification or the drawings can achieve a plurality of objects at the same time, and has technical usefulness in achieving one of the objects.

What is claimed is:

1. A vehicle charging system comprising:
a charging station including a cable-side connector;
a first vehicle including a first vehicle memory and a first electronic control unit (ECU), the first vehicle memory storing first vehicle identification information for identifying the first vehicle, and the first ECU including a first ECU memory storing first ECU identifying data for identifying the first ECU and first certificate data for receiving a charge service provided by the charging station;
a second vehicle including a second battery, a second vehicle-side connector, a second vehicle memory, and a second ECU, the second vehicle-side connector being configured to connect to the cable-side connector and charge power being supplied to the second battery by the connection, the second vehicle memory storing second vehicle identification information for identifying the second vehicle, and the second ECU including a second ECU memory storing second ECU identifying data for identifying the second ECU and second certificate data for receiving the charge service;
a management server including a first server memory storing a database and a first server processor connected to the first server memory, the database describing
  (i) a first combination of the first vehicle identification information, the first ECU identifying data, first payment information of a first user of the first vehicle, and the first certificate data, and
  (ii) a second combination of the second vehicle identification information, the second ECU identifying data, second payment information of a second user of the second vehicle, and the second certificate data;
a service server including a second server processor configured to issue the certificate data; and
a charging server including a third server processor and a third server memory storing the first and second certificate data, the charging server communicating with the charging station via an internet, wherein
in a case where the first ECU is removed from the first vehicle and the second vehicle is equipped with the first ECU instead of the second ECU,
the first server processor is configured to
  acquire the second vehicle identification information and the first ECU identification information from the second vehicle,
  determine that a combination of the second vehicle identification information and the first ECU identification information is not described in the database, and
  transmit a command requesting issuance of third certificate data to the service server,
the second server processor is further configured to issue the third certificate data and transmit the third certificate data to the charging server and the management server,
the third server processor is configured to delete the first and second certificate data and store the third certificate data in the third server memory,
the first server processor is further configured to
  delete the first and second combinations,
  store a third combination of the second vehicle identification information, the first ECU identifying data, the second payment information, and the third certificate data in the database, and
  transmit the third certificate data to the second vehicle equipped with the first ECU,
the first ECU is configured to
  delete the first certificate data and store the third certificate data in the first ECU memory,
  perform wired communication with the charging station in response to the second vehicle-side connector being connected to the cable-side connector,
  encrypt the third certificate data, and
  transmit the encrypted third certificate data to the charging server via the wired communication and the internet,
the third server processor is further configured to
  authenticate the received third certificate data from the first ECU based on the stored third certificate data,
  receive charging fee data from the charging station, and
  transmit the third certificate data and the charging fee data to the management server via the service server, and
the first server processor is further configured to settle the charging fee by using the second payment information based on the third combination.

* * * * *